US012762305B2

(12) United States Patent
Wang et al.

(10) Patent No.: US 12,762,305 B2
(45) Date of Patent: Oct. 13, 2026

(54) ENERGY FLOW OPTIMIZATION IN MULTI-ENERGY SYSTEM BASED ON SPATIOTEMPORAL NETWORK FLOWS

(71) Applicants: PEKING UNIVERSITY, Beijing (CN); NORTH CHINA ELECTRIC POWER UNIVERSITY, Beijing (CN); TSINGHUA UNIVERSITY, Beijing (CN); BEIJING TSINTERGY TECHNOLOGY CO., LTD., Beijing (CN)

(72) Inventors: Jianxiao Wang, Beijing (CN); Haiwang Zhong, Beijing (CN); Jie Song, Beijing (CN); Chen Yin, Beijing (CN); Qing Xia, Beijing (CN); Yang Wang, Beijing (CN); Xiaowen Lai, Beijing (CN)

(73) Assignees: PEKING UNIVERSITY, Beijing (CN); NORTH CHINA ELECTRIC POWER UNIVERSITY, Beijing (CN); TSINGHUA UNIVERSITY, Beijing (CN); BEIJING TSINTERGY TECHNOLOGY CO., LTD., Beijing (CN)

( * ) Notice: Subject to any disclaimer, the term of this patent is extended or adjusted under 35 U.S.C. 154(b) by 1011 days.

(21) Appl. No.: 18/052,979

(22) Filed: Nov. 7, 2022

(65) Prior Publication Data

US 2023/0177235 A1 Jun. 8, 2023

(30) Foreign Application Priority Data

Dec. 2, 2021 (CN) ......................... 202111459949.4

(51) Int. Cl.
*G06F 30/20* (2020.01)
*G06F 17/10* (2006.01)
(Continued)

(52) U.S. Cl.
CPC .............. *G06F 30/20* (2020.01); *G06F 17/10* (2013.01); *G06F 2111/04* (2020.01); *G06F 2113/04* (2020.01)

(58) Field of Classification Search
CPC ...... G06F 30/20; G06F 17/10; G06F 2113/04; G06F 2111/04
(Continued)

(56) References Cited

U.S. PATENT DOCUMENTS

2022/0247644 A1 * 8/2022 Kolter ................ G01R 19/2513

OTHER PUBLICATIONS

Fontenot_2019 (Modeling and control of building-integrated microgrids for optimal energy management—a review, Applied Energy 254 2019) (Year: 2019).*

(Continued)

*Primary Examiner* — Brian S Cook
(74) *Attorney, Agent, or Firm* — Hodgson Russ LLP

(57) ABSTRACT

A method for energy flow optimization in a multi-energy system based on spatiotemporal network flows is disclosed. The multi-energy system includes M energy storage devices, photovoltaic power generators and N micro gas turbines (MGTs). The method includes: obtaining an objective function of the network flows in the multi-energy system; determining constraints of the network flows, where the constraints include a power balance constraint, an energy storage period constraint, an energy storage capacity constraint, an energy storage charging and discharging constraint, a generator power constraint, and an energy storage charge quantity constraint; establishing a network flow model with the objective function and constraints; solving the network flow model with a shortest-path and max-flow algorithm, to obtain an optimal power flow (OPF) in the multi-energy system; operating the multi-energy system by adjusting parameters of the energy storage devices and the MGTs based on the OPF.

6 Claims, 4 Drawing Sheets

(51) Int. Cl.
*G06F 111/04* (2020.01)
*G06F 113/04* (2020.01)

(58) Field of Classification Search
USPC .............................................................. 703/2
See application file for complete search history.

(56) References Cited

OTHER PUBLICATIONS

Gupta_2015 (A robust optimization based approach for microgrid operation in deregulated environment, Energy Conversion and Management 93 2015) (Year: 2015).*
Khan_2016 (A compendium of optimization objectives, constraints, tools and algorithms for energy management in microgrids, Renewable and Sustainable Energy Reviews 58 2016) (Year: 2016).*
Topcoder_2018 (Minimum Cost Flow Part Two: Algorithms, Oct. 31, 2018) (Year: 2018).*

* cited by examiner

ENERGY FLOW OPTIMIZATION IN MULTI-ENERGY SYSTEM BASED ON SPATIOTEMPORAL NETWORK FLOWS

CROSS-REFERENCE TO RELATED APPLICATION

This application claims priority to Chinese Patent Application No. 202111459949.4, filed on Dec. 2, 2021, the entire disclosure of which is incorporated herein by reference.

TECHNICAL FIELD

The disclosure relates to a field of multi-energy optimization technology, and in particular to a method for energy flow optimization in a multi-energy system based on spatiotemporal network flows, a multi-energy system and a storage medium.

BACKGROUND

The multi-energy system is of great significance to improve the energy utilization efficiency, promote the large-scale development of renewable energy, improve a utilization rate of social infrastructure and the security of energy supply, and achieve goals of energy conservation and emission reduction. The multiple-energy system is an important hot research direction in the energy field. The energy flow optimization in the multi-energy system is a key to realize the efficiency and performance of the multi-energy system.

The energy flow optimization problem in the multi-energy system is a complex multi-constraint nonlinear problem, which is generally solved by existing mathematical methods with algebraic equations.

SUMMARY

According to a first aspect of the disclosure, a method for energy flow optimization in a multi-energy system based on spatiotemporal network flows is provided. The multi-energy system may include M energy storage devices, photovoltaic power generators and N micro gas turbines (MGTs). The method includes: obtaining an objective function of the network flows in the multi-energy system, where the objective function is expressed by $$\min\sum_{t=1}^{T}\sum_{n=1}^{N}C_{n,t}^{P}+\sum_{t=1}^{T}C_{t}^{\lambda},$$

where $$C_{n,t}^{P}$$

represents a power generation cost of the MGTs per sub-time t within time T, $$C_{t}^{\lambda}$$

represents an electricity purchase cost per sub-time t within time T, λ represents an electricity price, and P represents a power output; determining constraints of the network flows, where the constraints include a power balance constraint, an energy storage period constraint, an energy storage capacity constraint, an energy storage charging and discharging constraint, a generator power constraint, and an energy storage charge quantity constraint; establishing a network flow model with the objective function and constraints; solving the network flow model with a shortest-path and max-flow algorithm, to obtain an optimal power flow (OPF) in the multi-energy system; and operating the multi-energy system by adjusting parameters of the energy storage devices and the MGTs based on the OPF.

According to a second aspect of the disclosure, a multi-energy system is provided, which may include M energy storage devices, photovoltaic power generators, N micro gas turbines (MGTs), and a computing device for energy flow optimization in the multi-energy system based on spatiotemporal network flows. The computing device may include a processor and a memory for storing instructions executable by the processor. When the instructions are performed by the processor, the processor is caused to: obtain an objective function of the network flows in the multi-energy system, where the objective function is expressed by $$\min\sum_{t=1}^{T}\sum_{n=1}^{N}C_{n,t}^{P}+\sum_{t=1}^{T}C_{t}^{\lambda},$$

where $$C_{n,t}^{P}$$

represents a power generation cost of the MGTs per sub-time t within time T, $$C_{t}^{\lambda}$$

represents an electricity purchase cost per sub-time t within time T, 2 represents an electricity price, and P represents a power output; determine constraints of the network flows, where the constraints include a power balance constraint, an energy storage period constraint, an energy storage capacity constraint, an energy storage charging and discharging constraint, a generator power constraint, and an energy storage charge quantity constraint; establish a network flow model with the objective function and constraints; solve the network flow model with a shortest-path and max-flow algorithm, to obtain an optimal power flow (OPF) in the multi-energy system; and operate the multi-energy system by adjusting parameters of the energy storage devices and the MGTs based on the OPF.

According to a third aspect of the disclosure, a non-transitory computer readable storage medium stored with computer instructions is provided. When the computer instructions are executed by a computer, the computer is caused to perform a method for energy flow optimization in a multi-energy system based on spatiotemporal network flows. The multi-energy system may include M energy storage devices, photovoltaic power generators and N micro gas turbines (MGTs). The method includes: obtaining an objective function of the network flows in the multi-energy system, where the objective function is expressed by $$\min \sum_{t=1}^{T} \sum_{n=1}^{N} C_{n,t}^{P} + \sum_{t=1}^{T} C_t^{\lambda},$$

where $$C_{n,t}^{P}$$

represents a power generation cost of the MGTs per sub-time t within time T, $$C_t^{\lambda}$$

represents an electricity purchase cost per sub-time t within time T, λ represents an electricity price, and P represents a power output; determining constraints of the network flows, where the constraints include a power balance constraint, an energy storage period constraint, an energy storage capacity constraint, an energy storage charging and discharging constraint, a generator power constraint, and an energy storage charge quantity constraint; establishing a network flow model with the objective function and constraints; solving the network flow model with a shortest-path and max-flow algorithm, to obtain an optimal power flow (OPF) in the multi-energy system; and operating the multi-energy system by adjusting parameters of the energy storage devices and the MGTs based on the OPF.

Additional aspects and advantages of the disclosure will be given in part in the following description, which will become apparent from the following description, or learned through the practice of the disclosure.

BRIEF DESCRIPTION OF THE DRAWINGS

The above and/or additional aspects and advantages of the disclosure will become apparent and readily understood from the following description of embodiments taken in conjunction with the accompanying drawings.

DETAILED DESCRIPTION

Figure 1:
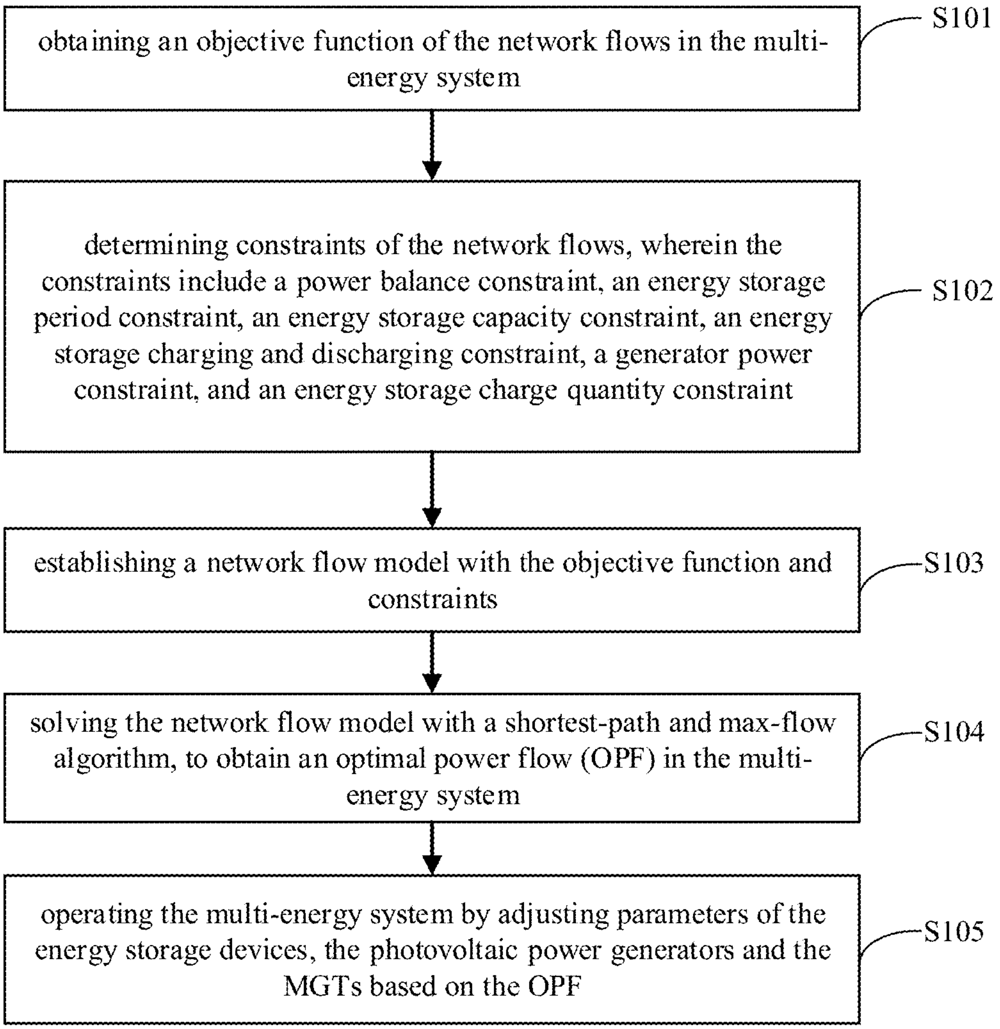
FIG. 1 is a schematic flowchart of a method for energy flow optimization in a multi-energy system based on spatiotemporal network flows according to Embodiment 1 of the disclosure.

The embodiments of the disclosure are described in detail below, examples of which are illustrated in the accompanying drawings. Throughout the drawings, the same or similar reference numerals refer to the same or similar elements or elements having the same or similar functions. The embodiments described below with reference to the accompanying drawings are exemplary, and are intended to be used to explain the disclosure, but should not be construed as a limitation to the disclosure.

In a classical algorithm, optimization algorithms such as mixed integer programming and interior point methods have been applied to energy flow computation in the multi-energy system, most of which are suitable for solving the problem in a multi-energy system with a moderate or small scale. However, programs for the classical algorithm are complicated, and the convergence of the classical algorithm strongly depends on the selected initial value. When an objective function in the classical algorithm is discontinuous or has multiple poles, the convergence may not occur or only a local convergence may occur. The classical algorithm requires a large number of matrix inversion operations, which reduces the computation speed. The classical algorithm is not suitable for solving strongly nonlinear/non-differentiable/non-convex optimization problems due to its limitations.

Intelligent algorithms may include reinforcement learning, a particle swarm algorithm, a fuzzy algorithm and a genetic algorithm, which have been applied to the energy flow optimization problem in the multi-energy system. The intelligent algorithms do not require a continuous and convex objective function and constraints. In some cases, they do not require analytical expressions. The intelligent algorithms have strong adaptability to the uncertainty of computational data. However, the theory of intelligent algorithms is not complete, and cannot guarantee the optimality of the solution. Thus, they are mostly regarded as a kind of heuristic algorithm.

At present, in a case of invoking a solver, it is difficult for a small-scale multi-energy system to afford high costs of the solver. Therefore, it is necessary to find a method for energy flow optimization in the multi-energy system, which is served as an alternative to solvers and is different from the classical algorithms and the intelligent algorithms.

In order to overcome the above problem in the related art, there is provided a method and a computing device for energy flow optimization in a multi-energy system based on spatiotemporal network flows. With the method and device, an overall process of generation, transmission, conversion, storage and consumption of energy flows in a multi-energy system may be optimally decided. The conventional algebraic model is replaced with a network model which is more intuitive and visual, the energy flow optimization problem in the multi-energy system is solved by a mini-cost and max-flow algorithm, so that the flow and conversion process of energy flows in the system may be optimized. The proposed method also avoids a large number of matrix inversion operations required for the computing solver, thus greatly improving the computational efficiency of the optimal power flow in the multi-energy system and improving the performance of operating the multi-energy system based on the optimal power flow.

The method and device for energy flow optimization in a multi-energy system based on spatiotemporal network flows are described below according to the embodiments of the disclosure with reference to the accompanying drawings.

FIG. 1 is a schematic flowchart of a method for energy flow optimization in a multi-energy system based on spatiotemporal network flows according to Embodiment 1 of the disclosure.

As shown in FIG. 1, the method for energy flow optimization in a multi-energy system based on spatiotemporal network flows includes the following steps at S101-S105. The multi-energy system includes M energy storage devices, photovoltaic power generators and N micro gas turbines (MGTs). The multi-energy system may purchase electricity from a power distribution network side.

At S101, an objective function of the network flows in the multi-energy system is obtained. The objective function is expressed by $$\min\sum_{t=1}^{T}\sum_{n=1}^{N}C_{n,t}^{P}+\sum_{t=1}^{T}C_{t}^{\lambda},$$

where $$C_{n,t}^{P}$$

represents a power generation cost of the MGTs per sub-time t within time T, $$C_{t}^{\lambda}$$

represents an electricity purchase cost per sub-time t within time T, λ represents an electricity price, and P represents a power output.

In the embodiment, the energy flow optimization in the multi-energy system is converted into an optimization problem of the objective function of the spatiotemporal network flows. The objective function is a sum of a power generation cost and an electricity purchase cost in the multi-energy system.

In a further embodiment of the disclosure, the power generation cost in the multi-energy system may refer to a power generation cost of the MGTs included in the system, which is expressed by $$C_{n,t}^{P}=aP_{n,t}^{G}+b,\text{ where }P_{n,t}^{G}$$

represents a power output of the n-th MGT at the time t, a and b are cost coefficients. The power generation cost is a linear function of the power output of the MGT. The electricity purchase cost is expressed by $$C_{t}^{\lambda}=\lambda_{t}P_{t}^{\lambda},\text{ where }P_{t}^{\lambda}$$

represents a power purchased from a power distribution network at the time t, and $\lambda_t$ represents an electricity price at the time t.

At S102, constraints of the network flows are determined, where the constraints include a power balance constraint, an energy storage period constraint, an energy storage capacity constraint, an energy storage charging and discharging constraint, a generator power constraint, and an energy storage charge quantity constraint.

In a further embodiment of the disclosure, the power balance constraint, the energy storage period constraint, the energy storage capacity constraint, the energy storage charging and discharging constraint, the generator power constraint, and the energy storage charge quantity constraint are expressed by:

$$\sum_{n=1}^{N}P_{n,t}^{G}+P_{t}^{\lambda}+P_{t}^{PV}+\sum_{m=1}^{M}P_{m,t}^{dis}-\sum_{m=1}^{M}P_{m,t}^{cha}=P_{t}^{load}$$

$$e_{m,t+1}=e_{m,t}+P_{m,t}^{cha}-P_{m,t}^{dis}$$

$$e_{m,0}=e_{m,T}$$

$$0\le P_{m,t}^{dis},P_{m,t}^{cha}\le P_{m,max}$$

$$P_{n,min}^{G}\le P_{n,t}^{G}\le P_{n,max}^{G}$$

$$e_{m,min}\le e_{m,t}\le e_{m,max},$$

where $$P_{t}^{PV}$$

is a photovoltaic power output emitted by the photovoltaic power generators at t, $$P_{m,t}^{dis}$$

is a discharging power of the m-th energy storage device at t, $$P_{m,t}^{cha}$$

is a charging power of the m-th energy storage device at t, $$P_{t}^{load}$$

is a load of the multi-energy system at t, $e_{m,t}$ is a charge quantity of the m-th energy storage device at t, $P_{m,max}$ is an upper limit of the charging and discharging power of the m-th energy storage device, $$P_{n,max}^{G}$$

is an upper limit of a power output of the n-th MGT, $$P_{n,min}^{G}$$

is a lower limit of the power output of the n-th MGT, $e_{m,max}$ is an upper limit of the charge quantity of the m-th energy storage device, $e_{m,min}$ is a lower limit of the charge quantity of the m-th energy storage device, $e_{m,0}$ is an initial charge quantity of the m-th energy storage device, and $e_{m,T}$ is a charge quantity at T of the m-th energy storage device.

In the embodiment of the disclosure, the objective function of the network flows in the multi-energy system are subject to the power balance constraint, the energy storage period constraint, the energy storage capacity constraint, the energy storage charging and discharging constraint, the generator power constraint, and the energy storage charge quantity constraint.

At S103, a network flow model with the objective function and constraints is established.

In the embodiment of the disclosure, the optimization problem of the objective function is converted into solving the network flow model for the multi-energy system.

At S104, the network flow model is solved by using a shortest-path and max-flow algorithm, to obtain an optimal power flow (OPF) in the multi-energy system.

In the embodiment of the disclosure, the OPF may refer to a power flow distribution where operation performance of the multi-energy system reaches an optimal value in response that the available control parameters of various generators and adjustable transformer taps meet operating safety indicators and normal power balance, in consideration that structural parameters and loads of the system have been given and known.

In the embodiment of the disclosure, since minimizing the objective function is matched to the shortest-path and max-flow in the graph theory, the solution to the network flow model is implemented by using a min-cost and max-flow algorithm. In this way, the computation of obtaining the OPF in the multi-energy system has a rapid speed, a high robustness and a good convergence.

At S105, the multi-energy system is operated by adjusting parameters of the energy storage devices, the photovoltaic power generators and the MGTs based on the OPF distribution.

The various devices in the multi-energy system are adjusted based on the OPF so as to achieve a high-efficiency operation of the multi-energy system.

In an example, for the small-scale multi-energy system, by information such as photovoltaic power and user loads are collected and sent to the cloud, the OPF during the whole period T is calculated at the cloud with the above method, in which the OPF may indicate discharging and charging behaviors of the energy storage devices, and specific powers of the MGTs at a specific time. Then, according to the OPF, each of the energy storage devices may be operated for discharging or charging, and each of the MGTs may be controlled to output a specific power at a specific time period, thus achieving the high-efficiency operation of the multi-energy system.

In a further embodiment of the disclosure, the method further includes: establishing a graph for the network flow model, where the graph includes M energy storage points B and a load point L in each period, a first auxiliary point S, a second auxiliary point E, a bidirectional arc connecting L and B, a power arc from S to L, a load arc from L to E, an energy storage arc between S and B, and an electricity storage arc BB; and determining the shortest-path by searching the arcs in the graph with the shortest-path and max-flow algorithm.

In a further embodiment of the disclosure, obtaining the OPF in the multi-energy system includes: S1, initializing each arc in the graph to enable an initial flow of each arc is 0; S2, for an arc with a flow smaller than a flow lower limit, setting a cost of the arc to be infinite negative value, and for an arc with a flow equal to a flow upper limit, setting a cost of the arc to be an infinite positive value; S3, calculating an increase margin of each arc on the shortest path, wherein the increase margin of each arc is equal to a difference value between a flow upper limit and a current flow, and selecting a min-margin with the minimum difference value; S4, adding a first flow corresponding to the min-margin to each arc on the shortest path, and subtracting the first flow from the current flow of the bidirectional arc; and S5, outputting the OPF in response to determining that the load after adding or subtracting the first flow is consistent with an initial load, and repeating acts at S2-S5 in response to determining that the load after adding or subtracting the first flow is not consistent with the initial load.

In a further embodiment of the disclosure, the shortest-path and max-flow algorithm is performed by acts of:

establishing an N*1 matrix D for storing arc costs, an N*1 matrix for storing a parent arc of each arc in a path, an N*1 matrix Lab for storing a marking state of each arc, where −1 indicates the arc is not marked and 0 indicates the arc is temporarily marked;

initializing values in the matrix P and values in the matrix Lab to be −1, and initializing the matrix D to give a maximum value;

retrieving arcs directly connected to a start arc, where an ending point of the start arc is S;

for the retrieved arcs, enabling values in the matrix D to be cost values of the retrieved arcs, changing values in the matrix Lab to be 0, recording numbers and costs of the retrieved arcs into a temporary matrix H;

in response to the temporary matrix H being not empty, selecting a min-arc with the minimum cost from the temporary matrix H;

in response to the min-arc arc being a set termination arc for searching, determining a path from the start arc to the min-arc arc as the shortest-path; and in response to the min-arc arc being not the set termination arc, retrieving an arc i meeting min+cost(i)<D(i) from arcs connected to the min-arc, determining a path from the start arc to a parent arc of the arc i as the shortest-path.

With the method according to the above embodiment of the disclosure, a conventional algebraic solution is replaced with a network flow model solution on the basis of graph theory, thus avoiding a large number of matrix inversion operations, forming a core technology suitable for the multi-energy system that direct optimizes energy flows, and greatly improving the computing efficiency. Through the network flow model solution, the transmission, conversion and storage of energy in the multi-energy system may be optimized dynamically. The transmission, transformation and consumption of energy may be effectively and intuitively displayed, so that the computation may be visualized. As a novel method for energy flow optimization, the disclosure provides a new core technology for the optimization problem in a multi-energy system, which has a deep industrial application value.

Figure 2:
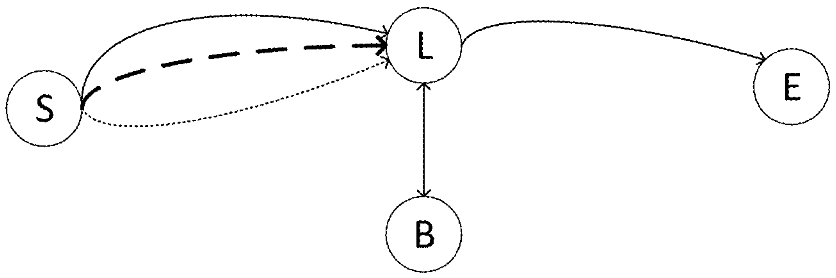
FIG. 2 is a diagram of power balance constraints for a network flow model according to Embodiment 1 of the disclosure.

FIG. 2 illustrates power balance constraints for the network flow model according to Embodiment 1 of the disclosure. As shown in FIG. 2, the power balance constraints are described based on the graph theory. The graph theory is well known in the art and may be not repeated here.

For the power balance constraints, S and E are served as graph auxiliary points, which are a start point and an end point of the graph, respectively, L represents a load point, and B represents an energy storage point. There are three arcs from S to L, in which the solid line represents a power generation arc, the thick dashed line represents a purchase arc, and the thin dashed line represents a photovoltaic arc. When there are a plurality of generator sets, the number of power generation arcs may be increased accordingly. The line between L and B belongs to a bidirectional arc, representing the charging and discharging of the battery (i.e., the energy storage device). The line between L and E represents a load arc. Since the path optimization is always performed from S to E, the increase of the load arc LE causes a corresponding increase of the SL arc or the BL arc, so as to realize the power balance constraints.

Figure 3:
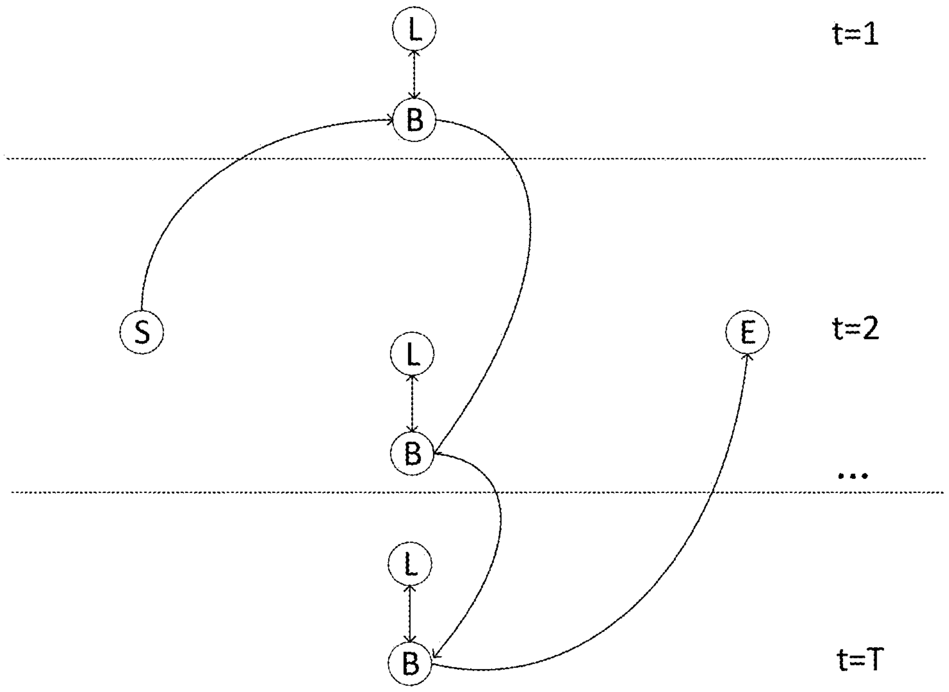
FIG. 3 is a diagram of energy storage period constraints for a network flow model according to Embodiment 1 of the disclosure.

FIG. 3 illustrates energy storage period constraints for the network flow model according to Embodiment 1 of the disclosure. As shown in FIG. 3, the energy storage period constraint and the energy storage charge quantity constraint are described based on the graph theory.

An initial value of energy storage is determined by giving a fixed-value arc SB in the first period (i.e., t=1), where the arc SB has a fixed upper and lower limit. Similarly, an end value of the energy storage is given at the end period (i.e., t=T) by a fixed-value BE, where the arc BE also has a fixed upper and lower limit. Then, the initial value of the energy storage (i.e., the value of arc SB) is enabled to be equal to the end value of the energy storage (i.e., the value of arc BE). In each time period, the residual energy (indicated by the arc BB) flows to the next time period after the energy exchange of the BL bidirectional arc (that is, charging and discharging), and the value is $e_{t+1}$. As such, the above two constraints are achieved in FIG. 3.

The upper and lower limit constraints of the given arc flow are described, which will be described in detail in the following algorithm.

In the computation, only the information is stored on an arc, and is expressed with a vector of [arc number, start node, end node, arc flow upper limit, arc flow lower limit, arc cost, flow].

The start arc has a number being −1, and the S has a number being 0. A start auxiliary arc segment and an end auxiliary arc segment are created. The start point of the start auxiliary arc segment is a start auxiliary point, and the end point of the end auxiliary arc segment is an end auxiliary point. At each time period, L and m B-nodes are numbered, the arcs are numbered based on the node numbers.

The information of each arc may be established as follows:

(1) For the start arc: there is only one start arc. The start point is the start auxiliary point and the end point is S. The flow upper limit is not set. The flow lower limit is 0. The unit flow cost=is 0. The start arc may be used for searching.

(2) For the power generation arc: there are N power generation arcs in each period, corresponding to the number of generator sets. The start point is S and the end point is L. The upper and lower limits of the power generation arc corresponding to the n-th generator set are the upper and lower limits of the power generation capacity of the generator set, and the unit flow cost of the power generation arc is the unit power generation cost of the generator set. The final flow of the power generation arc represents power generation of the generator set during this period.

(3) For the purchase arc: there is one in each period. The start point is S and the end point is L. The purchase arc has no upper limit and the lower limit is 0. The unit flow cost of the purchase arc in the t-th period is the electricity price in that period. The final flow of the purchase arc represents the electricity purchased in this period.

(4) For the photovoltaic arc: there is one in each period. The starting point is S and the end point is L. The flow is a photovoltaic power output during the period, so the upper and lower limits are equal to the photovoltaic power output, and the unit flow cost is 0. The final flow of the photovoltaic arc represents the photovoltaic power output during this period.

(5) For the LB charging arc: there are M arcs in each period, corresponding to the number of energy storage devices. The starting point is L and the end point is B. The upper limit of the charging arc corresponding to the m-th energy storage device is a charge-discharge power limit. In order to facilitate the calculation of the bidirectional arc, the lower limit is set to the opposite value of the charge-discharge power limit. The unit flow cost is 0. The final flow of the LB charging arc represents a charge quantity of the m-th energy storage device in this period.

(6) For the BL discharging arc: there are M arcs in each period, corresponding to the number of energy storage devices. The starting point is B, and the end point is L. The upper limit of the discharging arc corresponding to the m-th energy storage device is a charge-discharge power limit. In order to facilitate the calculation of the bidirectional arc, the lower limit is set to the opposite value of the charge-discharge power limit. The unit flow cost is 0. The final flow of the arc BL discharging represents a discharge quantity of the m-th energy storage device in this period.

(7) For the LE load arc: there is one arc in each period. The starting point is L and the end point is E. The unit flow cost is 0. The upper and lower limits of the load arc in the t-th period are set as a load amount in this period. The final flow represents the load amount in this period.

(8) For the BB energy storage arc: there are M arcs in each period rather than the last period, that is, there are (T−1)*M arcs. The starting point is B in the period from 1 to T−1, and the end point is B of the next energy storage device in the next period. The upper and lower limits of the energy storage arc of the m-th energy storage device in the t-th period are the upper and lower limits of the charge quantity of the m-th energy storage device. The cost per unit flow is 0. The final flow of the energy storage arc represents the charge quantity stored at the beginning of the next period.

(9) For the initial value arc of energy storage: there are M arcs in the initial period. The starting point is S, and the ending point is M points B in the initial period. A given value is assigned to the initial value of energy storage. The upper and lower limits of the initial arc of the m-th energy storage device are an energy storage charge quantity of the m-th energy storage device at the initial moment. The unit flow cost is 0. The final flow represents the energy storage charge quantity at the initial moment.

(10) For the end value arc of energy storage: there are M arcs in the end period. The starting point is M points B at the end period, and the ending point is E. The upper and lower limits of the end value arc of the m-th energy storage device are an energy storage charge quantity of the m-th energy storage device at the end moment, and the unit flow is 0. The final flow represents the energy storage charge quantity at the end moment of the entire process.

(11) For the termination arc: there is only one arc. The starting point is E, and the ending point is the end auxiliary point. No upper limit is set, the lower limit is 0, and the unit flow cost is 0. The termination arc is used for searching.

It can be seen that, for the arcs with upper and lower limits, the constraints are achieved by giving upper and lower limits. For the fixed-value arcs, giving a fixed value is achieved by defining the identical upper and lower limits.

Figure 4:
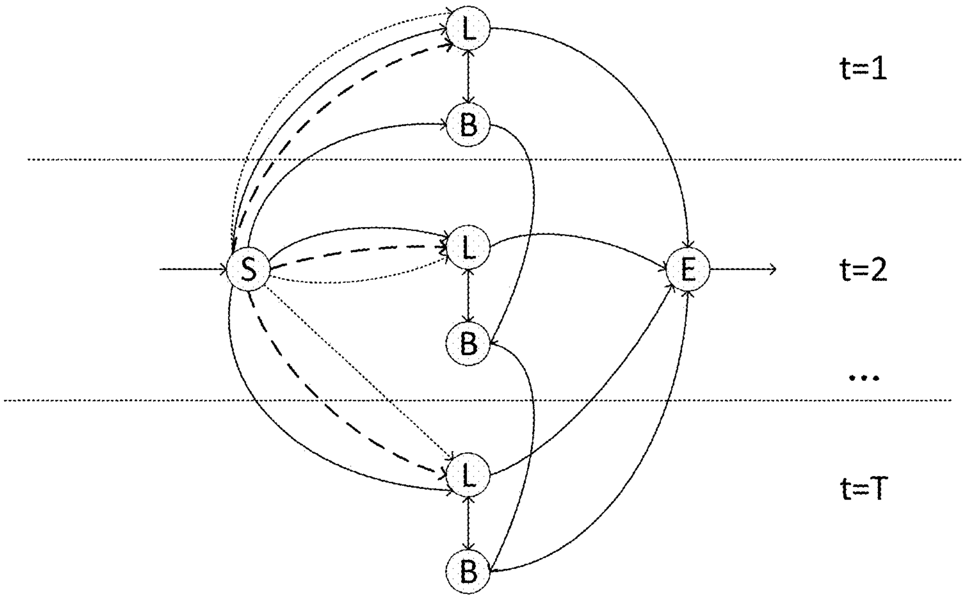
FIG. 4 is a diagram of a network flow model according to Embodiment 1 of the disclosure.

The resulting graph for the network flow model meeting the constraints is shown in FIG. 4. When there are multiple energy storage nodes, the corresponding number of B nodes are added to L in each period. Similarly, when there are multiple generator sets, the corresponding number of generating arcs are added in each period.

In a further embodiment of the disclosure, the above network flow model is solved by using a min-cost and max-flow algorithm. In particular, the min-cost and max-flow algorithm may include the following steps:

(a) all the arcs are initialized so that an initial flow of all arcs is 0.

(b) the arc cost of each arc is updated. When the arc flow is less than the lower limit of the arc flow, the arc cost is set to be an infinite negative value, that is, first meeting a flow demand for the arc. When the arc flow is equal to the upper limit of the arc flow, the arc cost is set to be an infinite positive value.

(c) a shortest path is obtained by a shortest path algorithm, an increase margin of each arc on the shortest path is calculated, where the increase margin of each arc is equal to a difference value between an upper limit of the arc flow and a current arc flow (i.e., the upper limit of the arc flow−the current arc flow). The minimum difference value is selected as a minimum margin.

(d) a flow corresponding to the minimum margin is added to each arc on the shortest path. When there is a charging arc/discharging arc on the shortest path, the flow corresponding to the minimum margin is subtracted from the arc flow of the discharge arc/charging arc.

(e) it is judged whether a load value after addition/subtraction at (d) is consistent with an initially set load value. If yes, the cycle ends and the OPF data is output. If no, the cycle at (b)-(e) may continue until that the load value after addition/subtraction at (d) is consistent with the initially set load value.

The shortest path algorithm in (c) is performed as follows:

(1) In the case of N arcs, an N*1 matrix D is established for storing arc costs; an N*1 matrix P is established for storing a parent arc of each arc in a path; and an N*1 matrix Lab is established for storing a marking state of each arc, where −1 indicates the arc is not marked and 0 indicates the arc is temporarily marked.

(2) All the values in the matrix P are initialized to be −1, all the values in the matrix Lab are initialized to be −1, and the matrix D is initialized to give a maximum value.

(3) search is started from the start arc, arcs directly connected to the start arc are retrieved, values corresponding to the retrieved arcs in the matrix D are caused to be arc cost values, marking values in the matrix Lab are changed to be 0, numbers and costs of the retrieved arcs are recorded into a temporary matrix H.

(4) when the matrix H is empty, it means that the subordinate arc of the start arc is not retrieved, and the path is interrupted, i.e., indicating that the search fails. When the matrix H is not empty, a "min-arc" with the minimum cost and its corresponding min-cost are selected from the matrix H. When the min-arc is a set termination arc for searching, indicating that the path is formed, the cycle stops and the search ends.

(5) When the min-arc arc is not the set termination arc for searching, all the subordinate arcs connected to the min-arc are retrieved. When the arc i meets min+cost(i)<D(i), then let D(i)=min+cost(i). That is the shortest path from the start arc to the arc i is obtained, and a vector of the parent arc of the arc i is changed to min-arc. When the arc i is not marked, the arc i is recorded into the matrix H. When the arc i has been temporarily marked, meaning that the arc i has been recorded in the matrix H, data of the arc i in the matrix H is then updated.

In order to realize the above embodiments, the disclosure also proposes a computing device for energy flow optimization in a multi-energy system based on spatiotemporal network flows.

Figure 5:
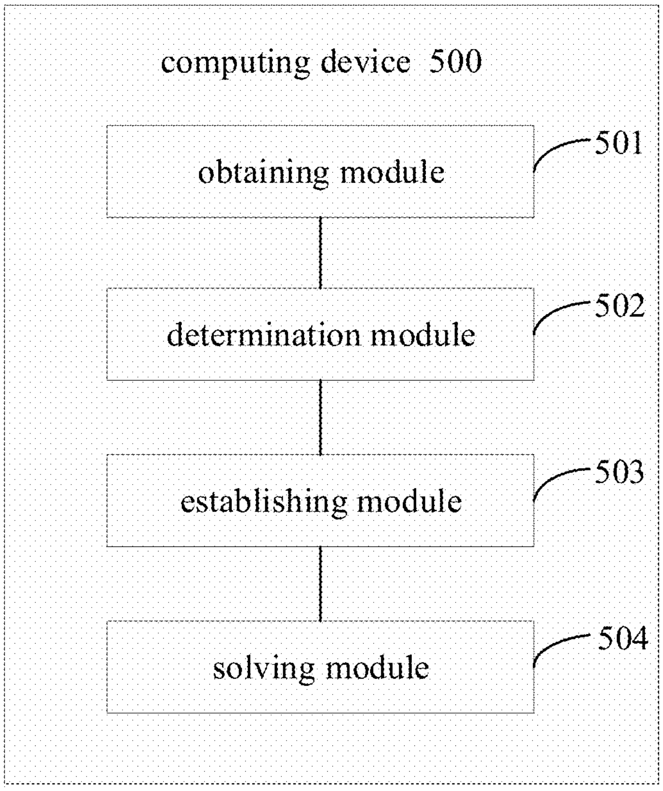
FIG. 5 is a structural schematic diagram of a computing device for energy flow optimization in a multi-energy system based on spatiotemporal network flows according to Embodiment 2 of the disclosure.

FIG. 5 is a structural schematic diagram of a computing device 500 for energy flow optimization in a multi-energy system based on spatiotemporal network flows according to Embodiment 2 of the disclosure.

As shown in FIG. 5, the computing device 500 includes various modules to perform the above method for energy flow optimization in a multi-energy system based on spatiotemporal network flows, e.g., an obtaining module 501, a determination module 502, an establishing module 503, a solving module 504.

The obtaining module is configured to obtain an objective function of the network flows in the multi-energy system. The objective function is expressed by $$\min\sum_{t=1}^{T}\sum_{n=1}^{N}C_{n,t}^{P}+\sum_{t=1}^{T}C_{t}^{\lambda},$$

where $$C_{n,t}^{P}$$

represents a power generation cost of the MGTs per sub-time t within time T, $$C_{t}^{\lambda}$$

represents an electricity purchase cost per sub-time t within time T, λ represents an electricity price, and P represents a power output.

The determination module is configured to determine constraints of the network flows, which include a power balance constraint, an energy storage period constraint, an energy storage capacity constraint, an energy storage charging and discharging constraint, a generator power constraint, and an energy storage charge quantity constraint.

The establishing module is configured to establish a network flow model with the objective function and constraints.

The solving module is configured to solve the network flow model with a shortest-path and max-flow algorithm, to obtain an optimal power flow (OPF) in the multi-energy system.

The parameters of the energy storage devices, the photovoltaic power generators and the MGTs are adjusted based on the OPF, for operating the multi-energy system.

It should be noted that the foregoing explanations on the above method embodiment are also applicable to the computing device in this embodiment, which may not be repeated here.

With the computing device according to the above embodiment of the disclosure, a conventional algebraic solution is replaced with a network flow model solution on the basis of graph theory, thus avoiding a large number of matrix inversion operations, forming a core technology suitable for the multi-energy system that direct optimizes energy flows, and greatly improving the computing efficiency. Through the network flow model solution, the transmission, conversion and storage of energy in the multi-energy system may be optimized dynamically. The transmission, transformation and consumption of energy may be effectively and intuitively displayed, so that the computation may be visualized. As a novel computing device for energy flow optimization, the disclosure provides a new core technology for the optimization problem in a multi-energy system, which has a deep industrial application value.

Figure 6:
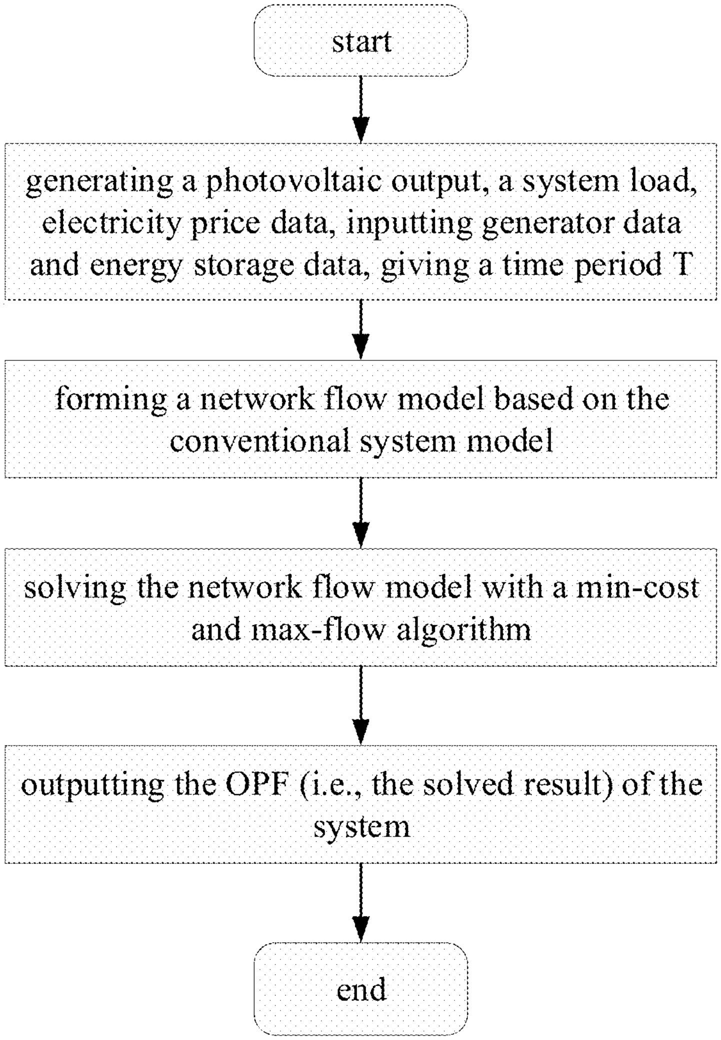
FIG. 6 is a diagram showing computation steps of energy flow optimization in a multi-energy system based on spatiotemporal network flows according to the disclosure.

FIG. 6 is a diagram showing computation steps of energy flow optimization in a multi-energy system based on spatiotemporal network flows according to the disclosure.

Firstly, various data in a multi-energy system is obtained, for example, photovoltaic power output data, load data, energy storage device data, electricity purchase price data, and generator power constraints, etc.

According to the obtained data, a network flow model is established. The model includes an objective function and various constraints. Then, an arc information matrix is formed according to the established model, and is solved with a shortest-path and max-flow algorithm to obtain an optimal power flow (OPF) in the multi-energy system.

The proposed computation steps overcome the defects of a conventional algebraic model, which are more intuitive and more robust, avoid a large number of matrix inversion operations required for the computing solver, and improve the computational efficiency of the optimal power flow in the multi-energy system. The multi-energy system may be operated based on the solved OPF, thus greatly improving the performance of the multi-energy system.

According to another embodiment of the disclosure, a non-transitory computer readable storage medium and a computer program product are further provided in the disclosure.

According to an embodiment of the disclosure, a computer program product including a computer program is further provided in the disclosure, the computer program is configured to perform the steps of the method as described in the above embodiment when performed by a processor.

In the description of this specification, the description referring to the terms "one embodiment", "some embodiments", "examples", "specific examples", or "some examples" means that the specific features, structures, materials, or features described in connection with the embodiments or examples are included in at least one embodiment or example of the disclosure. In this specification, the schematic expression of the above terms does not necessarily refer to the same embodiments or examples. Moreover, the specific features, structures, materials, or features described may be combined in a suitable manner in any one or more embodiments or examples. Furthermore, those skilled in the art may integrate and combine different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, a feature delimited with "first", "second" may expressly or implicitly include at least one of that feature. In the specification of the disclosure, "a plurality of" means at least two, such as two, three, etc., unless expressly and specifically defined otherwise.

Any process or method description in the flowchart or otherwise described herein may be understood as a module, a fragment or a part of code that represents executable instructions including one or more steps for implementing a particular logical function or process, and the scope of the preferred implementation of the disclosure includes additional implementations, which may not be in the order shown or discussed, which includes performing functions in a basically simultaneous manner or in a reverse order according to the involved functions, which should be understood by those skilled in the art to which the embodiments of the disclosure belong.

The logic and/or steps represented in flowcharts or otherwise described herein, for example, may be considered an ordered listing of executable instructions for implementing the logical functions, may be embodied in any computer-readable medium for use by or in conjunction with, an instruction execution system, apparatus, or device (such as a computer-based system, a system including a processor, or other system that may fetch instructions from and execute instructions from the instruction execution system, apparatus, or device). In view of this specification, a "computer-readable medium" may be any device that is able to contain, store, communicate, propagate, or transport programs for use by or in connection with the instruction execution system, apparatus, or device. More specific examples (non-exhaustive list) of computer readable media include: electrical connections (electronic devices) with one or more wiring, portable computer disk cartridges (magnetic devices), a random access memory (RAM), a read only memory (ROM), an erasable editable read only memory (EPROM) or a flash memory, fiber optic devices, and a portable compact disc read only memory (CD-ROM). In addition, the computer readable medium may even be paper or other suitable medium on which the programs may be printed, as the paper or other medium may be optically scanned, for example, followed by editing, interpretation, or other suitable medium as necessary process to obtain the programs electronically and then store them in the computer memory.

It should be understood that various parts of the disclosure may be implemented in hardware, software, firmware, or a combination thereof. In the above-described embodiments, various steps or methods may be implemented in software or firmware stored in a memory and executed by a suitable instruction execution system. For example, when various steps or methods may be implemented in hardware as in an another embodiment, any one of the following techniques known in the art, or their combination may be used for implementation: discrete logic circuits with logic gate circuits for realizing logic function of data signal, application specific integrated circuits with appropriate combined logic gate circuits, programmable gate arrays (PGAs), field programmable gate arrays (FPGAs), etc.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

Those skilled in the art may understand that all or part of the steps carried by the method of realizing the above embodiments may be completed by instructing the relevant hardware through a program, and the program may be stored in a computer-readable storage medium. When the program is executed, one or a combination of the steps of the method embodiments is implemented.

In addition, the functional units in various embodiments of the disclosure may be integrated in a processing module, or each unit may exist separately, or two or more units may be integrated in one module. The above integrated modules may be implemented in the form of hardware or software function modules. When the integrated module is realized in the form of software function module and sold or used as an independent product, it may also be stored in a computer-readable storage medium.

The storage medium mentioned above may be a read-only memory, a magnetic disk or an optical disk, etc. Although the embodiments of the disclosure have been shown and described above, it should be understood that the above embodiments are exemplary and should not be construed as limitations to the disclosure.

What is claimed is:

1. A method for energy flow optimization in a multi-energy system based on spatiotemporal network flows, wherein the multi-energy system includes M energy storage devices, photovoltaic power generators and N micro gas turbines (MGTs), the method comprising:

obtaining an objective function of the network flows in the multi-energy system, wherein the objective function is expressed by:

$$\min\sum_{t=1}^{T}\sum_{n=1}^{N}C_{n,t}^{P}+\sum_{t=1}^{T}C_{t}^{\lambda},$$

where $$C_{n,t}^{P}$$

represents a power generation cost of the MGTs per sub-time t within time T, $$C_{t}^{\lambda}$$

represents an electricity purchase cost per sub-time t within time T, λ represents an electricity price, and P represents a power output;

determining constraints of the network flows, wherein the constraints include a power balance constraint, an energy storage period constraint, an energy storage capacity constraint, an energy storage charging and discharging constraint, a generator power constraint, and an energy storage charge quantity constraint, wherein the constraints are expressed by:

$$\sum_{n=1}^{N}P_{n,t}^{G}+P_{t}^{\lambda}+P_{t}^{PV}+\sum_{m=1}^{M}P_{m,t}^{dis}-\sum_{m=1}^{M}P_{m,t}^{cha}=P_{t}^{load}$$

-continued $$e_{m,t+1}=e_{m,t}+P_{m,t}^{cha}-P_{m,t}^{dis}$$

$$e_{m,0}=e_{m,T}$$

$$0\le P_{m,t}^{dis},P_{m,t}^{cha}\le P_{m,max}$$

$$P_{n,min}^{G}\le P_{n,t}^{G}\le P_{n,max}^{G}$$

$$e_{m,min}\le e_{m,t}\le e_{m,max},$$

where $$P_{t}^{PV}$$

is a photovoltaic power output emitted by the photovoltaic power generators at t, $$P_{m,t}^{dis}$$

is a discharging power of the m-th energy storage device at t, $$P_{m,t}^{cha}$$

is a charging power of the m-th energy storage device at t, $$P_{t}^{load}$$

is a load of wie muru-energy system at t, $e_{m,t}$ is a charge quantity of the m-th energy storage device at t, $P_{m,max}$ is an upper limit of the charging and discharging power of the m-th energy storage device, $$P_{n,max}^{G}$$

is an upper limit of a power output of the n-th MGT, $$P_{n,min}^{G}$$

is a lower limit of the power output of the n-th MGT, $e_{m,max}$ is an upper limit of the charge quantity of the m-th energy storage device, $e_{m,min}$ is a lower limit of the charge quantity of the m-th energy storage device, $e_{m,0}$ is an initial charge quantity of the m-th energy storage device, and $e_{m,T}$ is a charge quantity at T of the m-th energy storage device;

establishing a network flow model with the objective function and constraints;

solving the network flow model with a shortest-path and max-flow algorithm, to obtain an optimal power flow (OPF) in the multi-energy system;

operating the multi-energy system by adjusting parameters of the energy storage devices and the MGTs based on the OPF;

establishing a graph for the network flow model, wherein the graph includes M energy storage points B and a load point L in each period, a first auxiliary point S, a second auxiliary point E, a bidirectional arc connecting L and B, a power arc from S to L, a load arc from L to E, an energy storage arc between S and B, and an electricity storage arc BB; and determining the shortest-path by searching the arcs in the graph with the shortest-path and max-flow algorithm;

wherein obtaining the OPF in the multi-energy system comprises:

S1, initializing each arc in the graph to enable an initial flow of each arc is 0;

S2, for an arc with a flow smaller than a flow lower limit, setting a cost of the arc to be infinite negative value, and for an arc with a flow equal to a flow upper limit, setting a cost of the arc to be an infinite positive value;

S3, calculating an increase margin of each arc on the shortest path, wherein the increase margin of each arc is equal to a difference value between a flow upper limit and a current flow, and selecting a min-margin with the minimum difference value;

S4, adding a first flow corresponding to the min-margin to each arc on the shortest path, and subtracting the first flow from the current flow of the bidirectional arc; and S5, outputting the OPF in response to determining that the load after adding or subtracting the first flow is consistent with an initial load, and repeating acts at S2-S5 in response to determining that the load after adding or subtracting the first flow is not consistent with the initial load;

wherein the shortest-path and max-flow algorithm is performed by acts of:

establishing an N*1 matrix D for storing arc costs, an N*1 matrix for storing a parent arc of each arc in a path, an N*1 matrix Lab for storing a marking state of each arc, where −1 indicates the arc is not marked and 0 indicates the arc is temporarily marked;

initializing values in the matrix P and values in the matrix Lab to be −1, and initializing the matrix D to give a maximum value;

retrieving arcs directly connected to a start arc, wherein an ending point of the start arc is S;

for the retrieved arcs, enabling values in the matrix D to be cost values of the retrieved arcs, changing values in the matrix Lab to be 0, recording numbers and costs of the retrieved arcs into a temporary matrix H;

in response to the temporary matrix H being not empty, selecting a min-arc with the minimum cost from the temporary matrix H;

in response to the min-arc arc being a set termination arc for searching, determining a path from the start arc to the min-arc arc as the shortest-path; and in response to the min-arc arc being not the set termination arc, retrieving an arc i meeting min+cost (i)<D (i) from arcs connected to the min-arc, determining a path from the start arc to a parent arc of the arc i as the shortest-path.

2. The method of claim 1, wherein the power generation cost of the MGTs is expressed by $$C^{P}_{n,t} = aP^{G}_{n,t} + b, \text{ where } P^{G}_{n,t}$$

represents a power output of the n-th MGT at t, a and b are cost coefficients; and the electricity purchase cost is expressed by $$C^{\lambda}_{t} = \lambda_t P^{\lambda}_{t}, \text{ where } P^{\lambda}_{t}$$

represents a power purchased from a power distribution network at t, and $\lambda_t$ represents an electricity price at t.

3. A multi-energy system, comprising: M energy storage devices, photovoltaic power generators, N micro gas turbines (MGTs), and a computing device for energy flow optimization in the multi-energy system based on spatiotemporal network flows, wherein the computing device comprises a processor and a memory for storing instructions executable by the processor;

wherein when the instructions are performed by the processor, the processor is caused to:

obtain an objective function of the network flows in the multi-energy system, wherein the objective function is expressed by:

$$\min \sum_{t=1}^{T} \sum_{n=1}^{N} C^{P}_{n,t} + \sum_{t=1}^{T} C^{\lambda}_{t},$$

where $$C^{P}_{n,t}$$

represents a power generation cost of the MGTs per sub-time t within time T, $$C^{\lambda}_{t}$$

represents an electricity purchase cost per sub-time t within time T, λ represents an electricity price, and P represents a power output;

determine constraints of the network flows, wherein the constraints include a power balance constraint, an energy storage period constraint, an energy storage capacity constraint, an energy storage charging and discharging constraint, a generator power constraint, and an energy storage charge quantity constraint;

establish a network flow model with the objective function and constraints; and solve the network flow model with a shortest-path and max-flow algorithm, to obtain an optimal power flow (OPF) in the multi-energy system;

wherein parameters of the energy storage devices, the photovoltaic power generators and the MGTs are adjusted based on the OPF, for operating the multi-energy system;

wherein the constraints are expressed by:

$$\sum_{n=1}^{N} P^{G}_{n,t} + P^{\lambda}_{t} + P^{PV}_{t} + \sum_{m=1}^{M} P^{dis}_{m,t} - \sum_{m=1}^{M} P^{cha}_{m,t} = P^{load}_{t}$$

$$e_{m,t+1} = e_{m,t} + P^{cha}_{m,t} - P^{dis}_{m,t}$$

-continued $$e_{m,0}=e_{m,T}$$

$$0\le P_{m,t}^{dis},P_{m,t}^{cha}\le P_{m,max}$$

$$P_{n,min}^{G}\le P_{n,t}^{G}\le P_{n,max}^{G}$$

$$e_{m,min}\le e_{m,t}\le e_{m,max},$$

where $$P_t^{PV}$$

is a photovoltaic power output emitted by the photovoltaic power generators at t, $$P_{m,t}^{dis}$$

is a discharging power of the m-th energy storage device at t, $$P_{m,t}^{cha}$$

is a charging power of the m-th energy storage device at t, $$P_t^{load}$$

is a load of the multi-energy system at t, $e_{m,t}$ is a charge quantity of the m-th energy storage device at t, $P_{m,max}$ is an upper limit of the charging and discharging power of the m-th energy storage device, $$P_{n,max}^{G}$$

is an upper limit of a power output of the n-th MGT, $$P_{n,min}^{G}$$

is a lower limit of the power output of the n-th MGT, $e_{m,max}$ is an upper limit of the charge quantity of the m-th energy storage device, $e_{m,min}$ is a lower limit of the charge quantity of the m-th energy storage device, $e_{m,0}$ is an initial charge quantity of the m-th energy storage device, and $e_{m,T}$ is a charge quantity at T of the m-th energy storage device;

wherein the processor is further caused to:

establish a graph for the network flow model, wherein the graph includes M energy storage points B and a load point L in each period, a first auxiliary point S, a second auxiliary point E, a bidirectional arc connecting L and B, a power arc from S to L, a load arc from L to E, an energy storage arc between S and B, and an electricity storage arc BB; and determine the shortest-path by searching the arcs in the graph with the shortest-path and max-flow algorithm;

wherein the processor is caused to obtain the OPF in the multi-energy system by acts of:

S1, initializing each arc in the graph to enable an initial flow of each arc is 0;

S2, for an arc with a flow smaller than a flow lower limit, setting a cost of the arc to be infinite negative value, and for an arc with a flow equal to a flow upper limit, setting a cost of the arc to be an infinite positive value;

S3, calculating an increase margin of each arc on the shortest path, wherein the increase margin of each arc is equal to a difference value between a flow upper limit and a current flow, and selecting a min-margin with the minimum difference value;

S4, adding a first flow corresponding to the min-margin to each arc on the shortest path, and subtracting the first flow from the current flow of the bidirectional arc; and

S5, outputting the OPF in response to determining that the load after adding or subtracting the first flow is consistent with an initial load, and repeating acts at S2-S5 in response to determining that the load after adding or subtracting the first flow is not consistent with the initial load;

wherein the processor is caused to perform the shortest-path and max-flow algorithm by acts of:

establishing an N*1 matrix D for storing arc costs, an N*1 matrix for storing a parent arc of each arc in a path, an N*1 matrix Lab for storing a marking state of each arc, where −1 indicates the arc is not marked and 0 indicates the arc is temporarily marked;

initializing values in the matrix P and values in the matrix Lab to be −1, and initializing the matrix D to give a maximum value;

retrieving arcs directly connected to a start arc, wherein an ending point of the start arc is S;

for the retrieved arcs, enabling values in the matrix D to be cost values of the retrieved arcs, changing values in the matrix Lab to be 0, recording numbers and costs of the retrieved arcs into a temporary matrix H;

in response to the temporary matrix H being not empty, selecting a min-arc with the minimum cost from the temporary matrix H;

in response to the min-arc arc being a set termination arc for searching, determining a path from the start arc to the min-arc arc as the shortest-path; and in response to the min-arc arc being not the set termination arc, retrieving an arc i meeting min+cost (i)<D (i) from arcs connected to the min-arc, determining a path from the start arc to a parent arc of the arc i as the shortest-path.

4. The system of claim 3, wherein the power generation cost of the MGTs is expressed by $$C_{n,t}^{P}=aP_{n,t}^{G}+b,\text{ where }P_{n,t}^{G}$$

represents a power output of the n-th MGT at t, a and b are cost coefficients; and the electricity purchase cost is expressed by $$C_t^{\lambda}=\lambda_t P_t^{\lambda},\text{ where }P_t^{\lambda}$$

represents a generator power output at t, and $\lambda_t$ represents an electricity price at t.

5. A non-transitory computer readable storage medium stored with computer instructions, wherein when the computer instructions are executed by a computer, the computer is caused to perform a method for energy flow optimization in a multi-energy system based on spatiotemporal network flows, the method comprising:

obtaining an objective function of the network flows in the multi-energy system, wherein the multi-energy system includes M energy storage devices, photovoltaic power generators and N micro gas turbines (MGTs), and the objective function is expressed by:

$$\min \sum_{t=1}^{T}\sum_{n=1}^{N} C_{n,t}^{P} + \sum_{t=1}^{T} C_t^{\lambda},$$

where $$C_{n,t}^{P}$$

represents a power generation cost of the MGTs per sub-time t within time T, $$C_t^{\lambda}$$

represents an electricity purchase cost per sub-time t within time T, $\lambda$ represents an electricity price, and P represents a power output;

determining constraints of the network flows, wherein the constraints include a power balance constraint, an energy storage period constraint, an energy storage capacity constraint, an energy storage charging and discharging constraint, a generator power constraint, and an energy storage charge quantity constraint, wherein the constraints are expressed by:

$$\sum_{n=1}^{N} P_{n,t}^{G} + P_t^{\lambda} + P_t^{PV} + \sum_{m=1}^{M} P_{m,t}^{dis} - \sum_{m=1}^{M} P_{m,t}^{cha} = P_t^{load}$$

$$e_{m,t+1} = e_{m,t} + P_{m,t}^{cha} - P_{m,t}^{dis}$$

$$e_{m,0} = e_{m,T}$$

$$0 \le P_{m,t}^{dis}, P_{m,t}^{cha} \le P_{m,max}$$

$$P_{n,min}^{G} \le P_{n,t}^{G} \le P_{n,max}^{G}$$

$$e_{m,min} \le e_{m,t} \le e_{m,max},$$

where $$P_t^{PV}$$

is a photovoltaic power output emitted by the photovoltaic power generators at t, $$P_{m,t}^{dis}$$

is a discharging power of the m-th energy storage device at t, $$P_{m,t}^{cha}$$

is a charging power of the m-th energy storage device at t, $$P_t^{load}$$

is a load of the multi-energy system at t, $e_{m,t}$ is a charge quantity of the m-th energy storage device at t, $P_{m,max}$ is an upper limit of the charging and discharging power of the m-th energy storage device, $$P_{n,max}^{G}$$

is an upper limit of a power output of the n-th MGT, $$P_{n,min}^{G}$$

is a lower limit or the power output of the n-th MGT, $e_{m,max}$ is an upper limit of the charge quantity of the m-th energy storage device, $e_{m,min}$ is a lower limit of the charge quantity of the m-th energy storage device, $e_{m,0}$ is an initial charge quantity of the m-th energy storage device, and $e_{m,T}$ is a charge quantity at T of the m-th energy storage device;

establishing a network flow model with the objective function and constraints;

solving the network flow model with a shortest-path and max-flow algorithm, to obtain an optimal power flow (OPF) in the multi-energy system;

operating the multi-energy system by adjusting parameters of the energy storage devices and the MGTs based on the OPF;

establishing a graph for the network flow model, wherein the graph includes M energy storage points B and a load point L in each period, a first auxiliary point S, a second auxiliary point E, a bidirectional arc connecting L and B, a power arc from S to L, a load arc from L to E, an energy storage arc between S and B, and an electricity storage arc BB; and determining the shortest-path by searching the arcs in the graph with the shortest-path and max-flow algorithm;

wherein obtaining the OPF in the multi-energy system comprises:

S1, initializing each arc in the graph to enable an initial flow of each arc is 0;

S2, for an arc with a flow smaller than a flow lower limit, setting a cost of the arc to be infinite negative value, and for an arc with a flow equal to a flow upper limit, setting a cost of the arc to be an infinite positive value;

S3, calculating an increase margin of each arc on the shortest path, wherein the increase margin of each arc is equal to a difference value between a flow upper limit and a current flow, and selecting a min-margin with the minimum difference value;

S4, adding a first flow corresponding to the min-margin to each arc on the shortest path, and subtracting the first flow from the current flow of the bidirectional arc; and

S5, outputting the OPF in response to determining that the load after adding or subtracting the first flow is consistent with an initial load, and repeating acts at S2-S5 in response to determining that the load after adding or subtracting the first flow is not consistent with the initial load;

wherein the shortest-path and max-flow algorithm is performed by acts of:

establishing an N*1 matrix D for storing arc costs, an N*1 matrix for storing a parent arc of each arc in a path, an N*1 matrix Lab for storing a marking state of each arc, where −1 indicates the arc is not marked and 0 indicates the arc is temporarily marked;

initializing values in the matrix P and values in the matrix Lab to be −1, and initializing the matrix D to give a maximum value;

retrieving arcs directly connected to a start arc, wherein an ending point of the start arc is S;

for the retrieved arcs, enabling values in the matrix D to be cost values of the retrieved arcs, changing values in the matrix Lab to be 0, recording numbers and costs of the retrieved arcs into a temporary matrix H;

in response to the temporary matrix H being not empty, selecting a min-arc with the minimum cost from the temporary matrix H;

in response to the min-arc arc being a set termination arc for searching, determining a path from the start arc to the min-arc arc as the shortest-path; and in response to the min-arc arc being not the set termination arc, retrieving an arc i meeting min+cost (i)<D (i) from arcs connected to the min-arc, determining a path from the start arc to a parent arc of the arc i as the shortest-path.

6. The storage medium of claim 5, wherein the power generation cost of the MGTs is expressed by $$C_{n,t}^{P} = aP_{n,t}^{G} + b, \text{ where } P_{n,t}^{G}$$

represents a power output of the n-th MGT at t, a and b are cost coefficients; and the electricity purchase cost is expressed by $$C_t^{\lambda} = \lambda_t P_t^{\lambda}, \text{ where } P_t^{\lambda}$$

represents a power purchased from a power distribution network at t, and $\lambda_t$ represents an electricity price at t.

* * * * *